US012686068B2

(12) United States Patent
Yoshikawa

(10) Patent No.: US 12,686,068 B2
(45) Date of Patent: Jul. 21, 2026

(54) METHOD FOR MANUFACTURING ADDITIVELY-MANUFACTURED OBJECT

(71) Applicant: KABUSHIKI KAISHA KOBE SEIKO SHO (KOBE STEEL, LTD.), Hyogo (JP)

(72) Inventor: Akinori Yoshikawa, Kobe (JP)

(73) Assignee: KABUSHIKI KAISHA KOBE SEIKO SHO (KOBE STEEL, LTD.), Hyogo (JP)

( * ) Notice: Subject to any disclaimer, the term of this patent is extended or adjusted under 35 U.S.C. 154(b) by 595 days.

(21) Appl. No.: 18/258,170

(22) PCT Filed: Dec. 15, 2021

(86) PCT No.: PCT/JP2021/046395
§ 371 (c)(1),
(2) Date: Jun. 16, 2023

(87) PCT Pub. No.: WO2022/149426
PCT Pub. Date: Jul. 14, 2022

(65) Prior Publication Data
US 2024/0051052 A1     Feb. 15, 2024

(30) Foreign Application Priority Data

Jan. 6, 2021     (JP) ................................. 2021-000993

(51) Int. Cl.
B23K 9/04          (2006.01)
B23K 9/032          (2006.01)
(Continued)

(52) U.S. Cl.
CPC ................ B23K 9/04 (2013.01); B23K 9/032 (2013.01); B23K 31/02 (2013.01); B23K 9/0953 (2013.01);
(Continued)

(58) Field of Classification Search
CPC .......... B23K 9/04; B23K 9/032; B23K 31/02; B23K 9/0953; B23K 9/0956;
(Continued)

(56) References Cited

U.S. PATENT DOCUMENTS

2019/0025798 A1*   1/2019   Yamasaki ............ B23K 26/342
2021/0370409 A1   12/2021   Takushima et al.
(Continued)

FOREIGN PATENT DOCUMENTS

CN       109128437 A       1/2019
EP        3536500 A1       9/2019
(Continued)

OTHER PUBLICATIONS

International Search Report issued in PCT/JP2021/046395; mailed Feb. 15, 2022.
(Continued)

*Primary Examiner* — Phuong T Nguyen
(74) *Attorney, Agent, or Firm* — Studebaker Brackett PLLC

(57)          ABSTRACT

In a building step, a base measurement processing of acquiring a measured height by measuring, using a shape sensor, a height of a base at a position where a torch is to be moved when depositing weld beads; a welding condition setting processing of obtaining a planned height of the base at the position where the torch is to be moved from a deposition plan, comparing the measured height acquired in the base measurement processing and the planned height to obtain a differential height, and setting a welding condition in a feedback correction for reducing the differential height; and a correction ratio update processing of performing a selection from a plurality of correction ratios set in advance and updating a correction ratio in the welding condition based on a selected correction ratio are executed.

6 Claims, 5 Drawing Sheets

(51) Int. Cl.

| | |
|---|---|
| *B23K 31/02* | (2006.01) |
| *B23K 9/095* | (2006.01) |
| *B23K 26/08* | (2014.01) |
| *B33Y 10/00* | (2015.01) |
| *B33Y 50/02* | (2015.01) |

(52) U.S. Cl.
CPC ........ *B23K 9/0956* (2013.01); *B23K 26/0884*
(2013.01); *B33Y 10/00* (2014.12); *B33Y 50/02*
(2014.12)

(58) Field of Classification Search
CPC .... B23K 26/0884; B23K 9/042; B23K 9/173;
B33Y 10/00; B33Y 50/02; B33Y 30/00
USPC ...... 219/76.1, 76.14, 130.32, 130.21, 121.11
See application file for complete search history.

(56) References Cited

U.S. PATENT DOCUMENTS

| | | | | |
|---|---|---|---|---|
| 2022/0324057 | A1* | 10/2022 | Takushima ............. | B23K 26/03 |
| 2023/0191690 | A1 | 6/2023 | Yoshikawa et al. | |

FOREIGN PATENT DOCUMENTS

| | | |
|---|---|---|
| EP | 3725453 A1 | 10/2020 |
| JP | 6576593 B1 | 9/2019 |
| JP | 6765569 B1 | 10/2020 |
| JP | 6797324 B1 | 12/2020 |

OTHER PUBLICATIONS

Written Opinion issued in PCT/JP2021/046395; mailed Feb. 15, 2022.
The extended European search report issued by the European Patent Office on Dec. 4, 2024, which corresponds to European Patent Application No. 21917647.6-1103 and is related to U.S. Appl. No. 18/258,170.

\* cited by examiner (A)

(B)

(A)

(B)

(C)

(D)

(E)

(A)

(B)

METHOD FOR MANUFACTURING ADDITIVELY-MANUFACTURED OBJECT

TECHNICAL FIELD

The present invention relates to a method for manufacturing an additively-manufactured object.

BACKGROUND ART

In recent years, a need for 3D printers as a means of production increases, and research and development are carried out for practical application in the aircraft industry and the like, especially for application to metal materials. A 3D printer using a metal material melts metal powder or metal wires using a heat source such as a laser or an arc, and deposits the molten metal to build a built object.

As a technique for building such a built object by welding, Patent Literature 1 discloses a technique of measuring a height of the built object having already been formed using a measurement unit, and feedback-controlling processing conditions when a new deposition is made at a measurement position according to a measurement result.

CITATION LIST

Patent Literature

Patent Literature 1: JP6576593B1

SUMMARY OF INVENTION

Technical Problem

However, in the feedback control when building a built object by depositing beads, when a deviation in height of a base portion is locally larger than expected, normal feedback control is not able to correct the processing conditions in time and it may be difficult to stably deposit the beads. For example, at a starting portion and an ending portion of the beads, the heights of the beads in lower layers tend to deviate greatly, which is difficult to deal with by the normal feedback control.

Accordingly, an object of the present invention is to provide a method for manufacturing an additively-manufactured object that is capable of building a good built object by constantly forming weld beads in a stable manner by appropriately performing feedback control.

Solution to Problem

The present invention includes the following configuration.

A method for manufacturing an additively-manufactured object, in which weld beads obtained by melting and solidifying a filler material is deposited with a torch while moving the torch to build a built object, the method including:

a building step of moving the torch to deposit the weld beads based on a deposition plan that defines a shape of the weld beads obtained from a target shape of the built object and a trajectory of the torch for forming the weld beads, in which in the building step, a base measurement processing of acquiring a measured height by measuring, using a shape sensor, a height of a base at a position where the torch is to be moved when depositing the weld beads, a welding condition setting processing of obtaining a planned height of the base at the position where the torch is to be moved from the deposition plan, comparing the measured height acquired in the base measurement processing and the planned height to obtain a differential height, and setting a welding condition in a feedback correction for reducing the differential height, and a correction ratio update processing of performing a selection from a plurality of correction ratios set in advance and updating a correction ratio in the welding condition based on a selected correction ratio are executed.

Advantageous Effects of Invention

The present invention is capable of building a good built object by constantly forming weld beads in a stable manner by appropriately performing feedback control.

DESCRIPTION OF EMBODIMENTS

Hereinafter, an embodiment of the present invention will be described in detail with reference to the drawings.

Figure 1:
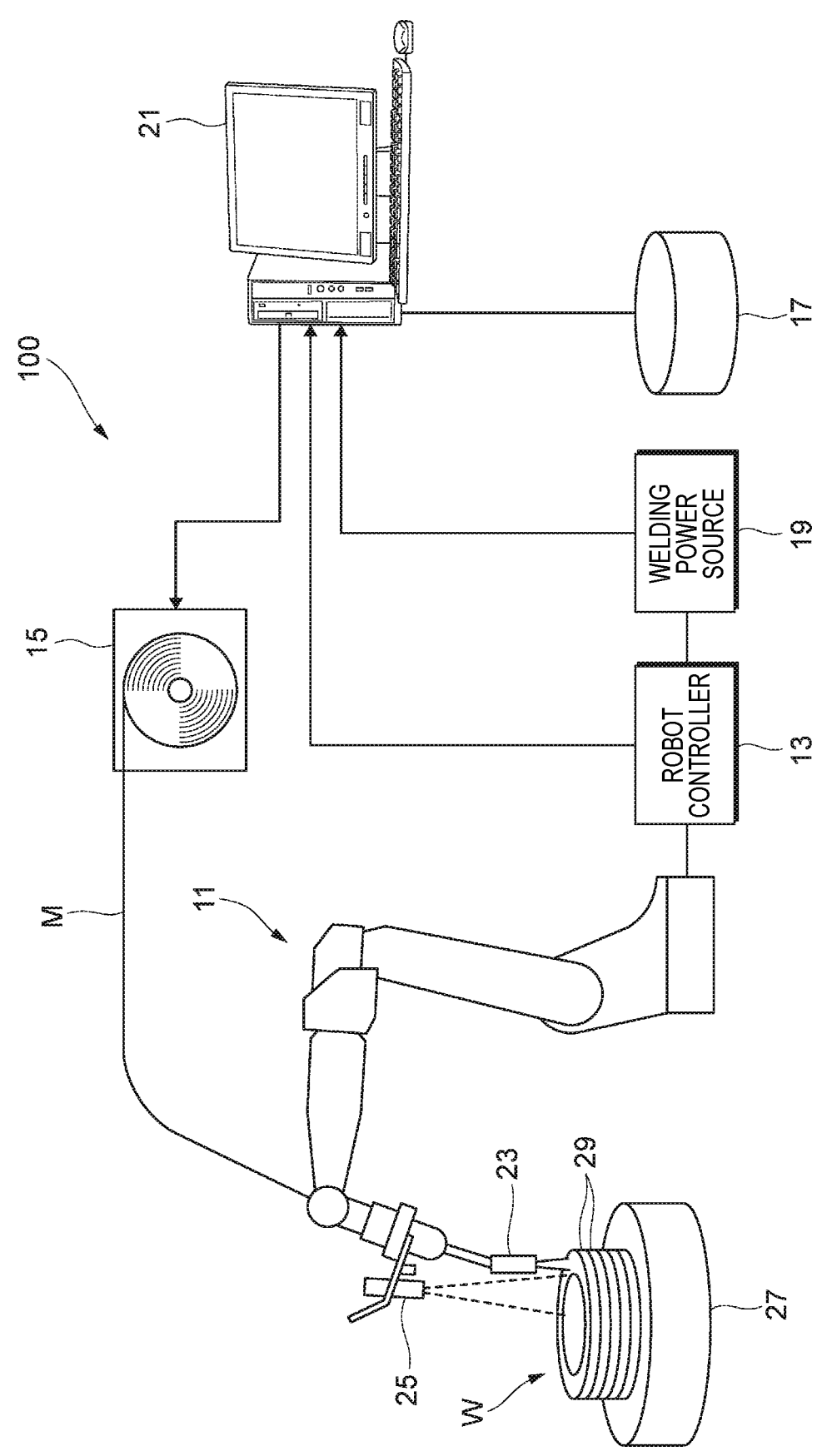
FIG. 1 is a schematic configuration diagram of a manufacturing system for manufacturing an additively-manufactured object by a manufacturing method according to an embodiment of the present invention.

FIG. 1 is a schematic configuration diagram of a manufacturing system 100 for manufacturing an additively-manufactured object by a manufacturing method according to the embodiment of the present invention.

The manufacturing system 100 for an additively-manufactured object having the present configuration includes a welding robot 11, a robot controller 13, a filler material supply unit 15, a welding power source 19, and a control unit 21.

The welding robot 11 is an articulated robot, and includes a tip shaft on which a torch 23 is supported. Position and posture of the torch 23 can be freely set three-dimensionally within a range of degrees of freedom of a robot arm. The torch 23 holds the filler material (welding wire) M continuously supplied from the filler material supply unit 15 in a state of protruding from a tip of the torch. A shape sensor 25 is provided on the tip shaft of the welding robot 11 together with the torch 23.

The torch 23 includes a shield nozzle (not shown), and shield gas is supplied from the shield nozzle to a weld part. An arc welding method may be a consumable electrode type such as shielded metal arc welding and carbon dioxide gas arc welding, or a non-consumable electrode type such as TIG welding and plasma arc welding, and is appropriately selected depending on an additively-manufactured object to be manufactured.

For example, in the case of the consumable electrode type, a contact tip is disposed inside the shield nozzle, and the filler material M to which a melting current is supplied is held on the contact tip. While holding the filler material M, the torch 23 generates an arc from a tip end of the filler material M in a shield gas atmosphere. The filler material M is fed to the torch 23 by a delivery mechanism (not shown) mounted on the robot arm or the like. Then, when the continuously fed filler material M is melted and solidified while the torch 23 is moved, weld beads 29, which are melted and solidified bodies of the filler material M, are formed on a base plate 27.

The base plate 27 is made of a metal plate such as a steel plate, and is basically larger than a bottom surface (lowermost layer surface) of an additively-manufactured object W. The base plate 27 is not limited to a plate-like shape base, and may be of other shapes such as a block body shape and a rod-like shape.

A heat source for melting the filler material M is not limited to the above-described arc. A heat source using another method such as a heating method using an arc and a laser together, a heating method using plasma, or a heating method using an electron beam or a laser may be used. In the case of heating by an electron beam or a laser, a heating amount may be controlled more finely to keep each weld bead in a more proper state, thereby contributing to further improvement in quality of the additively-manufactured object.

Any commercially available welding wire can be used as the filler material M. For example, wires defined in MAG welding solid wires and MIG welding solid wires for mild steel, high tensile steel, and cryogenic steel (JIS Z 3312), arc welding flux-cored wires for mild steel, high tensile steel, and cryogenic steel (JIS Z 3313) and the like can be used.

An active metal such as titanium can also be used as the filler material M. In this case, it is necessary to put the weld part into the shield gas atmosphere in order to avoid oxidation and nitridation due to reaction with the atmosphere during welding.

The shape sensor 25 is disposed in parallel with the torch 23 and is moved together with the torch 23. The shape sensor 25 is a sensor for measuring a shape of a portion serving as a base when forming weld beads B. As the shape sensor 25, for example, a laser sensor that acquires reflected light of emitted laser light as height data is used. Note that a three-dimensional shape measuring camera may be used as the shape sensor 25.

The robot controller 13 receives an instruction from the control unit 21 to drive each portion of the welding robot 11 and controls an output of the welding power source 19 as necessary.

The control unit 21 is implemented by a computer device including a CPU, a memory, a storage, and the like, and executes a drive program prepared in advance or a drive program created under desired conditions to drive each portion of the welding robot 11 and the like. As a result, the additively-manufactured object W having a multi-layer structure is built by moving the torch 23 according to the drive program and depositing the weld beads 29 in multiple layers on the base plate 27 based on a created deposition plan. A database 17 is also connected to the control unit 21. In this database 17, data of a plurality of correction ratios in a welding condition during feedback correction is stored in advance.

Next, a case where the additively-manufactured object W is manufactured by the manufacturing system 100 will be described.

Figure 2:
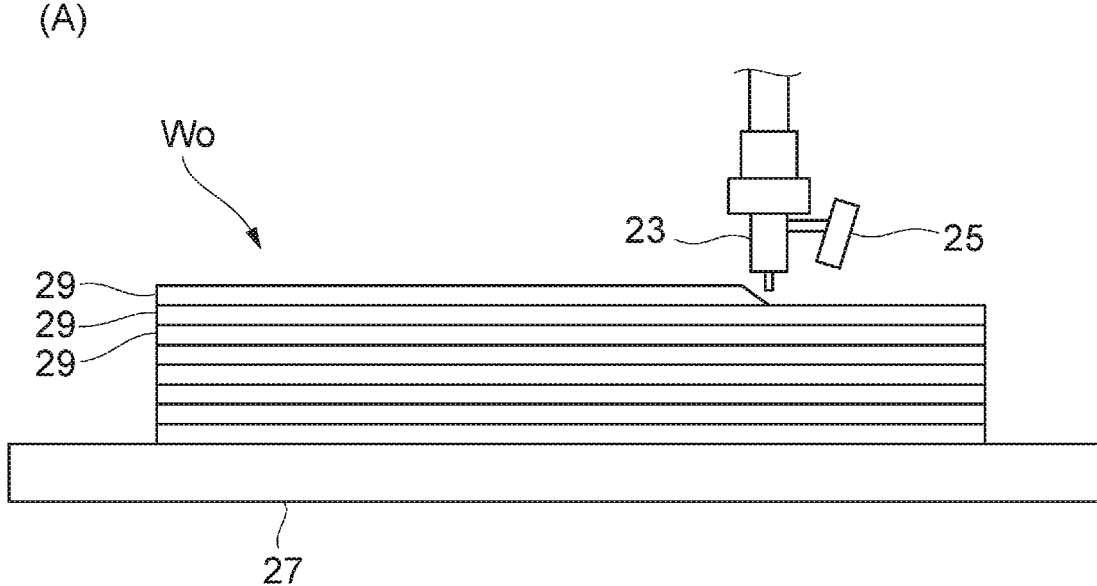
FIG. 2 is a diagram illustrating wall portions formed by depositing weld beads, in which (A) and (B) are both schematic side views.
Figure 2:
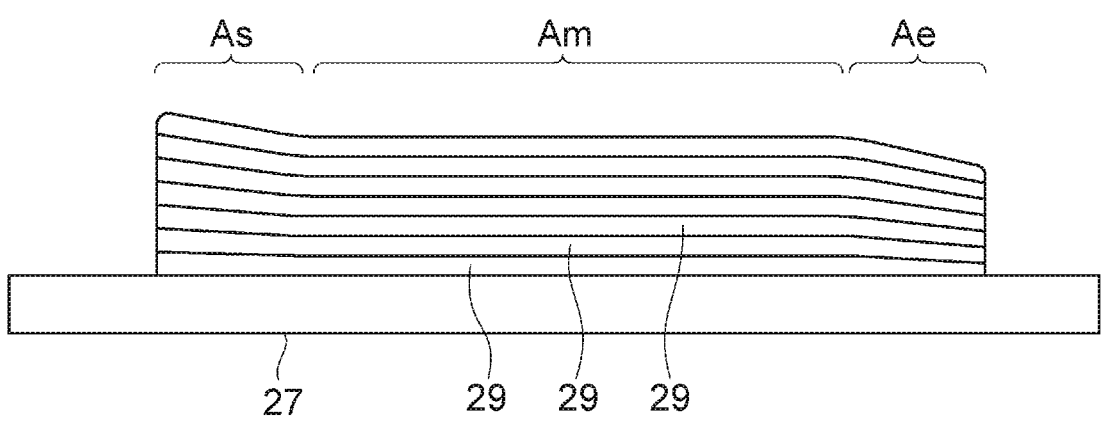
Figure 3:
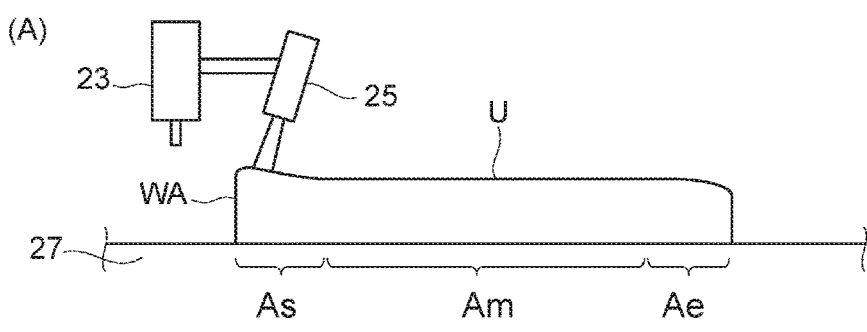
FIG. 3 is a diagram illustrating a building step of building a wall portion by depositing weld beads, in which (A) to (E) are all schematic side views of the wall portion.
Figure 3:
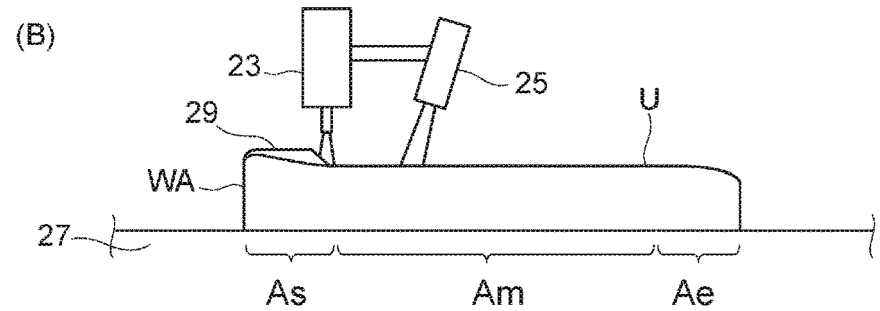
Figure 3:
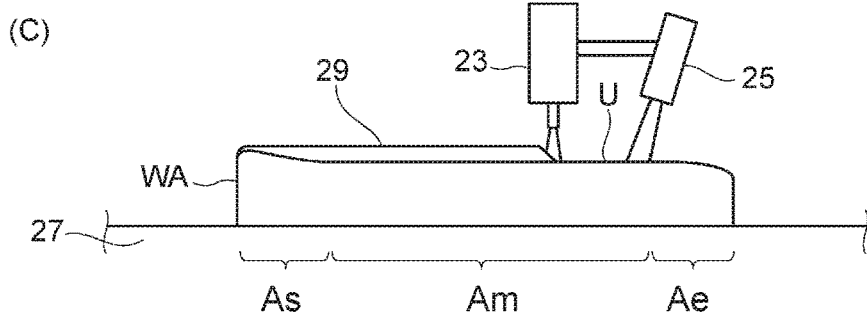
Figure 3:
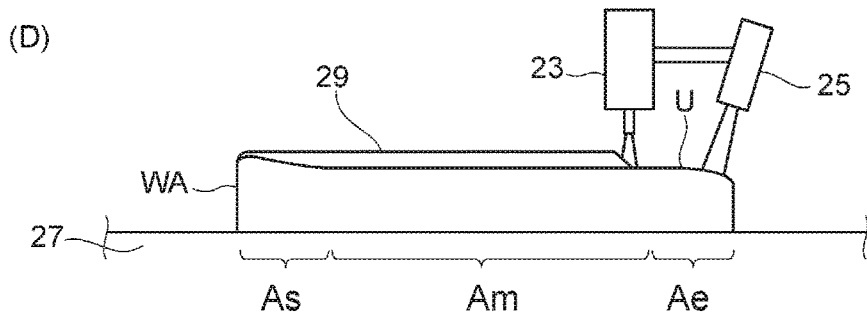
Figure 3:
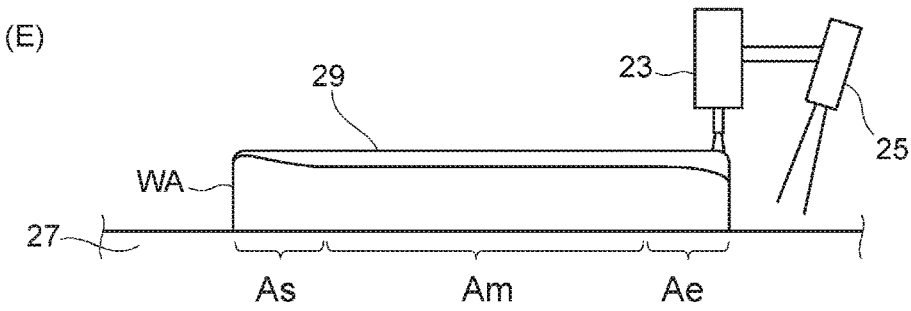

FIG. 2 is a schematic side view of an additively-manufactured object in which the linear weld beads 29 are deposited on the base plate 27 to build a wall portion Wo. FIG. 3 is a step diagram illustrating a building step of building the wall portion Wo by depositing the weld beads 29.

As illustrated in (A) of FIG. 2, when building the wall portion Wo, one end (a left end in (A) of FIG. 2) side is used as a starting, and the torch 23 is moved from this starting to start forming the weld beads 29, and the torch 23 is moved to an ending on the other end (a right end in (A) of FIG. 2) side to complete the formation of the weld beads 29. Then, the formation of the linear weld beads 29 is repeated to build the wall portion Wo in which the plurality of linear weld beads 29 are deposited. In this case, the control unit 21 measures the shape of the base with the shape sensor 25 disposed in parallel with the torch 23, and performs the feedback correction for correcting the welding condition based on a measurement result.

As illustrated in (B) of FIG. 2, when the weld beads 29 are formed by moving the torch 23 from the starting to the ending, in a middle portion between a starting portion and an ending portion of the weld beads 29, the formation of the weld beads 29 by the torch 23 is stabilized. Therefore, in a middle area Am, it is possible to build into a shape with less unevenness along a target shape based on the deposition plan. As a result, the middle area Am, which can be formed with this stable thickness, can be dealt with by normal feedback correction.

On the other hand, in a starting area As and an ending area Ae, a thickness of the formed weld beads 29 tends to be unstable. Specifically, the weld beads 29 tend to thicken and swell in the starting area As, and the weld beads 29 tend to thin and droop in the ending area Ae. Therefore, in the starting area As and the ending area Ae where the thickness is unstable, the normal feedback correction may not be able to make correction in time.

In this case, in order to deal with the starting area As and the ending area Ae, the correction ratio of the welding condition in the feedback correction may be increased, but in the middle area Am where the weld beads 29 can be stably formed, abrupt correction rather causes large unevenness.

For this reason, in the manufacturing method according to the present embodiment, the following feedback correction is performed in the building step of depositing the weld beads 29.

(Base Measurement Processing)

The shape sensor 25 measures a height of the base at a position where the torch 23 is to be moved when the weld beads 29 are deposited. Then, a measured height Hr, which is the height of the base measured by the shape sensor 25, is obtained.

(Welding Condition Setting Processing)

A planned height Hp of the base at the position where the torch 23 is to be moved is obtained from the deposition plan, and a differential height $\Delta H$ ($\Delta H = Hr - Hp$) is obtained by comparing the measured height Hr acquired in the base measurement processing and the planned height Hp, and the welding condition is set so as to reduce the differential height $\Delta H$.

(Correction Ratio Update Processing)

Selection from the plurality of correction ratios set in advance is performed according to a shape characteristic of the position where the torch 23 is to be moved. The plurality of correction ratios is pre-determined by, for example, experiments or the like in order to stably form the weld beads 29 with respect to various shape characteristics, and are stored in the database 17. Then, based on a selected correction ratio, a correction ratio in the welding condition (for example, a ratio of increase or decrease in a travel speed with respect to the differential height ΔH) is updated. For example, in portions where the thickness is unstable, such as the starting area As and the ending area Ae, when building the wall portion Wo, correction ratios corresponding to the shape characteristics of these portions are selected and retrieved from the database 17, and the correction ratio of the welding condition is updated to the selected correction ratios. Note that in this correction ratio update processing, when the position where the torch 23 is to be moved has a shape characteristic that does not require updating the correction ratio of the welding condition, the correction ratio in the welding condition set in the welding condition setting processing is maintained without selecting any correction ratio. For example, in the portion where the thickness is stable, such as the middle area Am when building the wall portion Wo, the correction ratio in the welding condition set in the welding condition setting processing is maintained.

When updating the above-described correction ratio, a maintenance period (correction interval Δt) for maintaining a state in which the correction ratio is changed for a predetermined period may also be set. The correction interval Δt may be set in terms of time or length along a path. A unique correction interval Δt may be set only for a specific correction ratio.

When the correction interval Δt is not set, correction control is performed in a short period of time in accordance with local changes in height of the existing weld beads (height of base), and depending on a condition, the correction control may be a transient reaction. In that case, a height of a newly formed weld bead may be greater than local unevenness of the base.

Therefore, by reducing sensitivity of the correction control by setting the correction interval Δt, it is possible to mitigate the reaction so as to form a gently uneven base shape without causing a local steep height change. In this way, it becomes relatively easy to correct a height of a layer (an upper layer) to be formed next.

Next, an example of the feedback correction in the building step when building the wall portion Wo will be described.

Figure 4:
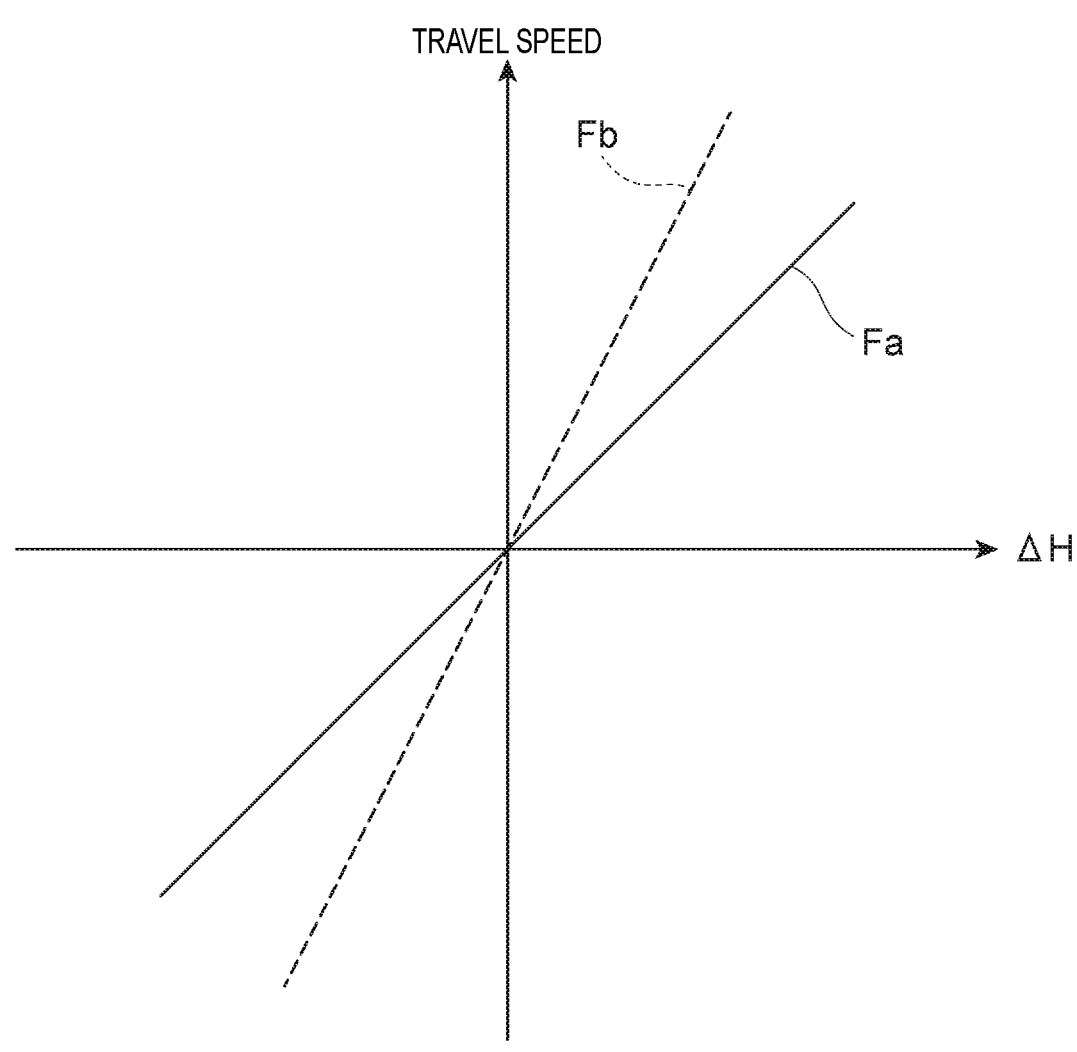
FIG. 4 is a graph illustrating correction ratios in a welding condition.
Figure 5:
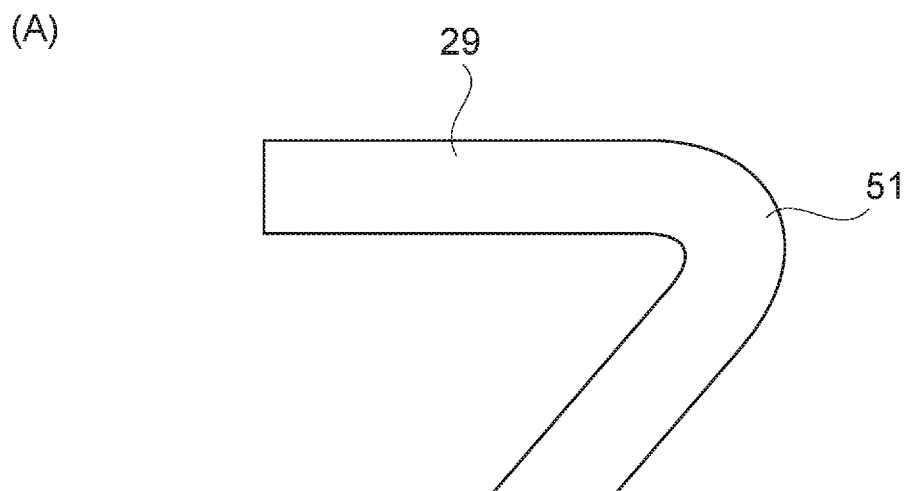
FIG. 5 is a diagram illustrating shapes of weld beads, in which (A) is a schematic plan view of a weld bead including a bent portion, and (B) is a schematic plan view of a weld bead including a crossing portion.
Figure 5:
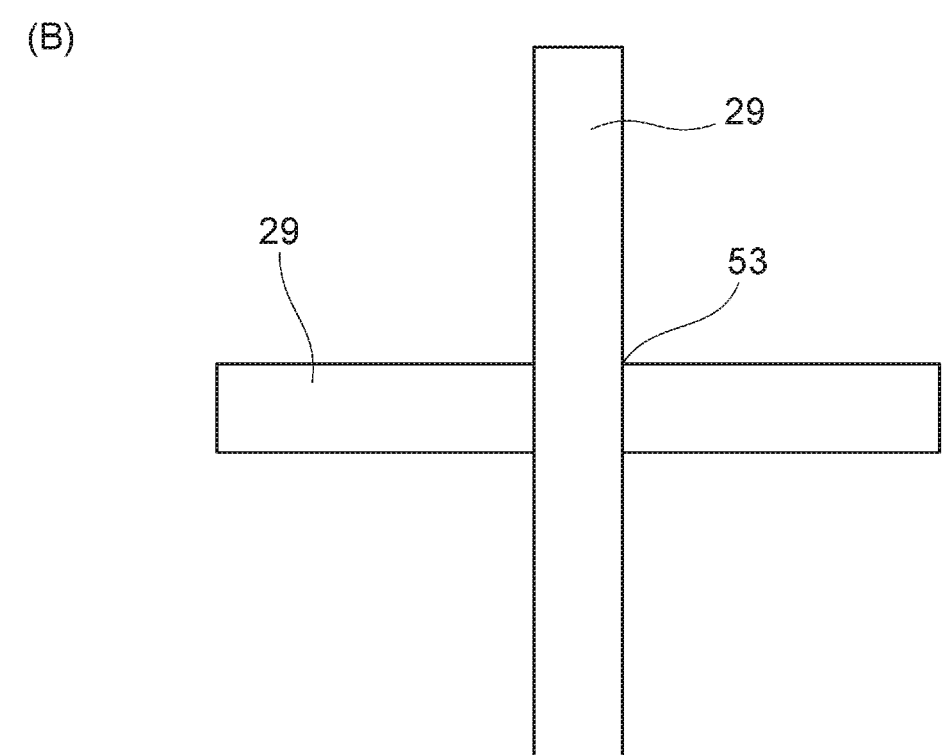

FIG. 4 is a graph illustrating correction ratios in a welding condition. FIG. 5 is a schematic plan view illustrating shapes of the weld beads 29.

(Starting Area As)

As illustrated in (A) of FIG. 3, the shape sensor 25 disposed in parallel with the torch 23 is disposed at the starting portion of a base U of a built body WA on which the weld beads 29 are already deposited, and the shape sensor 25 and the torch 23 are moved along the built body WA. Then, the shape sensor 25 measures a height of the starting area As of the base U in the built body WA to acquire the measured height Hr (base measurement processing).

The control unit 21 obtains the planned height Hp of the base U from the deposition plan, and compares the measured height Hr acquired by the shape sensor 25 with the planned height Hp. Then, the measured height Hr, the planned height Hp, and the differential height ΔH (ΔH=Hr−Hp) are obtained, and the welding condition is set so as to reduce the differential height ΔH (welding condition setting processing).

Here, FIG. 4 illustrates the correction ratio between the differential height ΔH and the travel speed in the feedback correction, and for example, the control unit 21 sets a welding condition of a correction ratio Fa (a solid line in FIG. 4) for the normal feedback correction.

Next, the control unit 21 performs the correction ratio update processing for updating the correction ratio in the welding condition. Specifically, since the starting area As is an area having a shape characteristic with a large amount of change in height, a correction ratio Fb (a dotted line in FIG. 4) corresponding to the shape characteristic of the starting area As is selected from the plurality of correction ratios set for each of shape characteristics stored in the database 17. Then, the correction ratio Fa in the welding condition is updated to the selected correction ratio Fb. This correction ratio Fb has a larger travel speed change rate with respect to the differential height ΔH than that of the correction ratio Fa, and therefore, by updating to this correction ratio Fb, it becomes possible to quickly change the travel speed with respect to the differential height ΔH in the feedback correction.

As illustrated in (B) of FIG. 3, the shape sensor 25 and the torch 23 are moved along the built body WA toward the ending side, and the weld beads 29 are deposited on the starting area As of the base U by the torch 23. In this case, the feedback correction is performed by the correction ratio Fb that enables the travel speed to be changed quickly with respect to the differential height ΔH. Therefore, the height of the weld beads 29 formed by the torch 23 can be quickly corrected with respect to shape change with a large differential height ΔH.

(Middle Area Am)

When the torch 23 forms the weld beads 29 in the starting area As, the shape sensor disposed in parallel with the torch 23 continues to measure a height of the middle area Am of the base U (base measurement processing). Then, the measured height Hr and the planned height Hp are compared to obtain the differential height ΔH (ΔH=Hr−Hp), and for example, the welding condition of the correction ratio Fa (the solid line in FIG. 4) for the normal feedback correction is set so as to reduce the differential height ΔH (welding condition setting processing).

Next, the control unit 21 performs the correction ratio update processing for updating the correction ratio in the welding condition. Here, since the middle area Am is an area having a stable shape characteristic with a relatively small amount of change in height, in the correction ratio update processing, the control unit 21 does not select any correction ratio from the database 17, and maintains the correction ratio Fa (the solid line in FIG. 4) in the welding condition set in the welding condition setting processing.

As illustrated in (C) of FIG. 3, the shape sensor 25 and the torch 23 are moved along the built body WA toward the ending side, and the weld beads 29 are deposited on the middle area Am of the base U by the torch 23. In this case, the feedback correction is performed by the correction ratio Fa that gently changes the travel speed with respect to the differential height ΔH. Therefore, the height of the weld beads 29 formed by the torch 23 can be smoothly corrected with respect to shape change with a small differential height ΔH.

(Ending Area Ae)

As illustrated in (D) of FIG. 3, when the shape sensor 25 reaches the ending area Ae of the base U of the built body WA, the height of the ending area Ae is measured by the shape sensor 25 to acquire the measured height Hr (base measurement processing). Then, the measured height Hr and the planned height Hp of the base U from the deposition plan are compared to obtain the differential height ΔH (ΔH=Hr–Hp), and the welding condition of the correction ratio Fa (the solid line in FIG. 4) is set so as to reduce the differential height ΔH (welding condition setting processing).

Next, the control unit 21 performs the correction ratio update processing for updating the correction ratio in the welding condition. Specifically, since the ending area Ae is an area having a shape characteristic with a large amount of change in height, the control unit 21 selects the correction ratio Fb (the dotted line in FIG. 4) corresponding to the shape characteristic of the ending area Ae from the plurality of correction ratios set for each of the shape characteristics stored in the database 17, and updates the correction ratio Fa in the welding condition to the selected correction ratio Fb. Here, the correction ratio corresponding to the shape characteristic of the ending area Ae is set as the correction ratio Fb corresponding to the shape characteristic of the starting area As. Note that the correction ratios corresponding to the shape characteristics of the starting area As and the ending area Ae may be different.

As illustrated in (E) of FIG. 3, the weld beads 29 are deposited on the ending area Ae by the torch 23 that reaches the ending area Ae. In this case, the feedback correction is performed by the correction ratio Fb that enables the travel speed to be changed quickly with respect to the differential height ΔH. Therefore, the height of the weld beads 29 formed by the torch 23 can be quickly corrected with respect to shape change with a large differential height ΔH.

As described above, according to the method for manufacturing an additively-manufactured object according to the present embodiment, the correction ratio of the welding condition in the feedback correction, which reduces the differential height ΔH between the planned height Hp based on the deposition plan and the measured height Hr actually measured, is updated to the correction ratio selected from the plurality of correction ratios set and prepared in advance. In this way, the weld beads 29 can be stably formed by performing the feedback correction at appropriately selected correction ratios for cases of various height deviations.

For example, by setting a small correction ratio for a position with an average and moderate height deviation and setting a large correction ratio for a local and large height deviation, the weld beads 29 can be stably formed in an appropriate control mode according to the shape characteristic of a portion where the weld beads 29 are built.

Note that the correction ratio is not limited to being set in advance and in plural according to the shape characteristics. A plurality of correction ratios may be set in advance according to positions specified based on the deposition plan. The specified positions include, for example, positions where variations are likely to occur locally in a frame, a filling portion within a frame, a corner of a frame, an overhang, or the like.

For example, at a bent portion 51 when the weld beads 29 are bent and deposited as illustrated in (A) of FIG. 5, at a crossing portion 53 when the weld beads 29 are crossed in a cross shape and deposited as illustrated in (B) of FIG. 5, or the like, the deposition height of the weld beads 29 tends to vary locally. Therefore, the bent portion 51, the crossing portion 53, or both of the two are taken as the specified positions, and the correction ratios corresponding to the specified positions are set. Then, when forming the weld beads 29, at the specified position such as the bent portion 51 or the crossing portion 53, a correction ratio corresponding to the specified position is selected, and the correction ratio in the welding condition for feedback correction is updated to the selected correction ratio. As a result, the weld beads 29 can be formed while dealing with an abrupt height variation at the specified position such as the bent portion 51 or the crossing portion 53.

A base profile may be obtained from the measurement result of the shape sensor 25 on a front side in a movement direction of the torch 23, and the shape characteristic of the position where the torch 23 is to be moved may be obtained in real time from this base profile and a target profile obtained from the deposition plan. Then, in the correction ratio update processing, a correction ratio corresponding to the shape characteristic obtained during building may be selected from the plurality of correction ratios set in advance, and the correction ratio in the welding condition may be updated based on the selected correction ratio.

In this way, when forming the weld beads 29, the weld beads 29 can be stably formed in an appropriate control mode even for an unexpected large height deviation and local unevenness, while sensing the shape of the base in real time.

Note that in the above embodiment, the correction ratio of the travel speed with respect to the differential height ΔH is used as a parameter in the feedback correction, but the parameter of the correction ratio with respect to the differential height ΔH is not limited to the travel speed, and may be a feeding speed of the filler material M or a heat input for generating the arc.

For example, when the feeding speed of the filler material M is used as the parameter, a formed height of the weld beads 29 can be increased by increasing the feeding speed, and the formed height of the weld beads 29 can be reduced by reducing the feeding speed. When the heat input is used as the parameter, the formed height of the weld beads 29 can be reduced by increasing the heat input, and the formed height of the weld beads 29 can be increased by reducing the heat input.

In the above embodiment, the shape sensor 25 is disposed in parallel with the torch 23 as an example, but the shape sensor 25 may be disposed not in parallel with the torch 23. For example, a robot that moves the shape sensor 25 may be provided separately from the welding robot 11, and this robot may measure the shape of the base on the front side in the movement direction of the torch 23 forming the weld beads 29.

Therefore, the present invention is not limited to the above-described embodiments, and the present invention intends to combine the configurations of the embodiments with each other, and is also intended to be changed and applied by those skilled in the art based on the description of the specification and a well-known technique, which are included in the scope required to be protected.

As described above, the present description discloses the following matters.

(1) A method for manufacturing an additively-manufactured object, in which weld beads obtained by melting and solidifying a filler material is deposited with a torch while moving the torch to build a built object, the method including:

a building step of moving the torch to deposit the weld beads based on a deposition plan that defines a shape of the weld beads obtained from a target shape of the built object and a trajectory of the torch for forming the weld beads, in which in the building step, a base measurement processing of acquiring a measured height by measuring, using a shape sensor, a height of a base at a position where the torch is to be moved when depositing the weld beads, a welding condition setting processing of obtaining a planned height of the base at the position where the torch is to be moved from the deposition plan, comparing the measured height acquired in the base measurement processing and the planned height to obtain a differential height, and setting a welding condition in a feedback correction for reducing the differential height, and a correction ratio update processing of performing a selection from a plurality of correction ratios set in advance and updating a correction ratio in the welding condition based on a selected correction ratio are executed.

According to the method for manufacturing an additively-manufactured object, the correction ratio of the welding condition in the feedback correction, which reduces the differential height between the planned height based on the deposition plan and the measured height actually measured, is updated to the correction ratio selected from the plurality of correction ratios set and prepared in advance. In this way, the weld beads can be stably formed by performing the feedback correction at appropriately selected correction ratios for cases of various height deviations.

(2) The method for manufacturing an additively-manufactured object according to (1), in which the plurality of correction ratios is set according to a shape characteristic of a position where the weld beads are deposited.

According to the method for manufacturing an additively-manufactured object, for example, by setting a small correction ratio for a position with an average and moderate height deviation and setting a large correction ratio for a local and large height deviation, the weld beads can be stably formed in an appropriate control mode according to the shape characteristic of a portion where the weld beads are built.

(3) The method for manufacturing an additively-manufactured object according to (2), in which the plurality of correction ratios is set in advance according to a shape characteristic of a position specified based on the deposition plan.

According to the method for manufacturing an additively-manufactured object, the weld beads can be stably formed in an appropriate control mode according to a position that can be recognized in advance based on the deposition plan.

(4) The method for manufacturing an additively-manufactured object according to (2), in which in the correction ratio update processing, a base profile is obtained from a measurement result of the shape sensor, a shape characteristic of the position where the torch is to be moved is obtained from the base profile and a target profile obtained from the deposition plan, the selection from the plurality of correction ratios set in advance is performed according to the shape characteristic, and the correction ratio in the welding condition is updated based on the selected correction ratio.

According to the method for manufacturing an additively-manufactured object, the shape characteristic of the position where the torch is to be moved is obtained in real time from the base profile and the target profile, and the correction ratio is selected according to the shape characteristic. That is, the weld beads can be stably formed in an appropriate control mode even for an unexpected large height deviation and local unevenness, while sensing the shape of the base in real time.

The present application is based on a Japanese Patent Application (Patent Application No. 2021-000993) filed on Jan. 6, 2021, the contents of which are incorporated herein by reference.

REFERENCE SIGNS LIST

23 torch
29 weld bead
25 shape sensor
Fa, Fb correction ratio
ΔH differential height
M filler material
U base
W additively-manufactured object

The invention claimed is:

1. A method for manufacturing an additively-manufactured object, wherein weld beads obtained by melting and solidifying a filler material is deposited with a torch while moving the torch to build a built object, the method comprising:

a building processing including:

moving the torch from a starting to an ending to deposit the weld beads based on a deposition plan that defines a shape of the weld beads obtained from a target shape of the built object and a trajectory of the torch for forming the weld beads, a base measurement processing of acquiring a measured height by measuring, using a shape sensor, a height of a base at a position where the torch is to be moved when depositing the weld beads, a welding condition setting processing of obtaining a planned height of the base at the position where the torch is to be moved from the deposition plan, comparing the measured height acquired in the base measurement processing and the planned height to obtain a differential height, and setting a welding condition in a feedback correction for reducing the differential height, and a correction ratio update processing of performing a selection from a plurality of correction ratios set in advance according to a shape characteristic of a position where the weld beads are deposited and updating a correction ratio in the welding condition based on a selected correction ratio, wherein when the position where the torch is to be moved is in a starting area for depositing the weld beads, a correction ratio corresponding to a shape characteristic of the starting area is selected from the plurality of correction ratios set for each of shape characteristics to update the welding condition so as to change a travel speed, wherein when the position where the torch is to be moved is in an ending area for depositing the weld beads, a correction ratio corresponding to a shape characteristic of the ending area is selected from the plurality of correction ratios to update the welding condition, and wherein when the position where the torch is to be moved is in a middle area between the starting area and the ending area, the correction ratio is not selected and the welding condition set is maintained.

2. The method for manufacturing an additively-manufactured object according to claim 1, wherein a correction interval is provided for maintaining a state in which the correction ratio is changed for a predetermined period.

3. The method for manufacturing an additively-manufactured object according to claim 2, wherein the plurality of correction ratios is set in advance according to a shape characteristic of a position specified based on the deposition plan.

4. The method for manufacturing an additively-manufactured object according to claim 2, wherein in the correction ratio update processing, a base profile is obtained from a measurement result of the shape sensor, a shape characteristic of the position where the torch is to be moved is obtained from the base profile and a target profile obtained from the deposition plan, the selection from the plurality of correction ratios set in advance is performed according to the shape characteristic, and the correction ratio in the welding condition is updated based on the selected correction ratio.

5. The method for manufacturing an additively-manufactured object according to claim 1, wherein the plurality of correction ratios is set in advance further according to a shape characteristic of a position specified based on the deposition plan.

6. The method for manufacturing an additively-manufactured object according to claim 1, wherein in the correction ratio update processing, a base profile is obtained from a measurement result of the shape sensor, a shape characteristic of the position where the torch is to be moved is obtained from the base profile and a target profile obtained from the deposition plan, the selection from the plurality of correction ratios set in advance is performed according to the shape characteristic, and the correction ratio in the welding condition is updated based on the selected correction ratio.

* * * * *